Aug. 9, 1938.   A. J. WEATHERHEAD, JR   2,126,594

METHOD OF MAKING REFRIGERATOR VALVES

Filed March 23, 1935

Inventor
ALBERT J. WEATHERHEAD, JR.
By Richey & Watts
Attorneys

Patented Aug. 9, 1938

2,126,594

UNITED STATES PATENT OFFICE 2,126,594

METHOD OF MAKING REFRIGERATOR VALVES

Albert J. Weatherhead, Jr., Cleveland, Ohio, assignor to The Weatherhead Company, Cleveland, Ohio, a corporation of Ohio Application March 23, 1935, Serial No. 12,734

3 Claims. (Cl. 29—157.1)

This invention relates to valve bodies and methods of making the same, and the invention is described herein with reference to a type of valve especially adapted for use in refrigerators and having a supporting flange through which a fluid connection is made to the interior of the valve body.

It is among the objects of the present invention to provide a valve body which can be rapidly and economically produced from steel bar stock or other ferrous material. Another object of my invention is to provide a method for economically producing such valves. Another object is to provide a method of producing valve bodies having a supporting flange and fluid connections therethrough, from ordinary steel bar stock with a minimum number of machining operations required. Another object is to provide a valve body which has great strength and rigidity. Another object is to provide a fluid conducting and supporting attachment for hollow fluid conducting members which can be produced economically from flat stock. A further object is to provide a method of making such an attachment and assembling it with a hollow fluid conducting member. Another object is to provide a corrosion resisting ferrous valve body and a method of producing the same.

Figure 1:
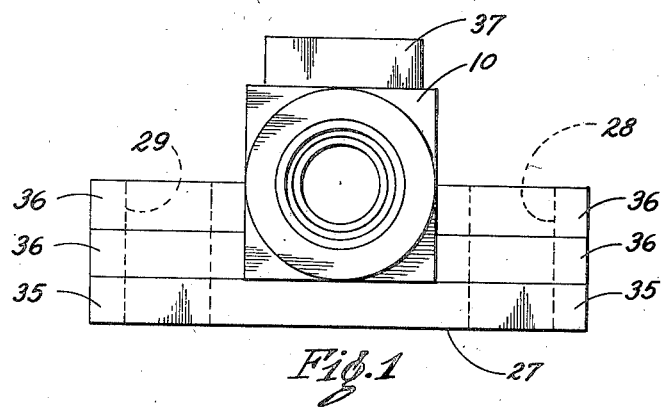
Figure 2:
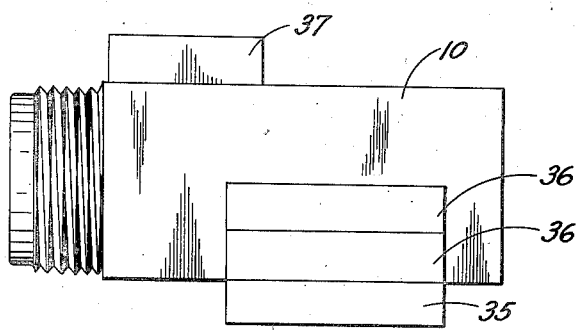
Figure 3:
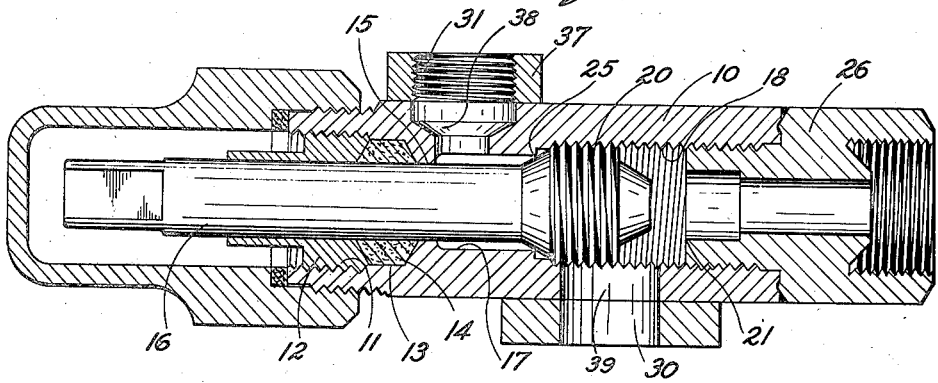

Other objects and advantages of my invention will become apparent from the following description of a preferred form thereof, reference being made to the accompanying drawing, wherein Figure 1 is an end elevation of a valve body made according to my invention; Figure 2 is a side elevation of the valve; and Figure 3 is a transverse section through a complete valve assembly.

As illustrated in the drawing, the completed valve may comprise a body portion 10 preferably having square or other angular cross section. The body portion is provided with a central bore or passageway of various different diameters, the central passageway having a threaded portion 11 at one end to receive the packing nut 12, a cylindrical portion 13 within which the packing 14 is disposed, a cylindrical portion 15 of smaller diameter which provides a shoulder to retain the packing 14 and further assists in guiding the valve stem 16, an enlarged cylindrical portion 17 surrounding the valve stem 16 and providing a passageway for fluid around the valve stem, and a threaded portion 18 which engages the threads of the valve member 20. The threaded portion 18 is of somewhat larger diameter than the cylindrical portion 17, thus leaving between the two portions a shoulder 25 which forms a seat for the valve 20. At the outer end of the threaded portion 18, a fluid connection fitting 26 is provided, this member preferably being constructed in accordance with the teachings of my Patent No. 1,733,925, for attachment to the flared end of a copper pipe or tube.

The valve disclosed herein is known as a flanged compressor valve, the valve body being provided with a transversely extending securing flange indicated generally at 27 and having openings 28 and 29 therethrough for receiving attaching bolts for clamping the valve to the compressor of a refrigerator. The flange portion is provided with a passageway 30 extending through the flange portion and the wall of the valve body into the threaded portion 18 of the central bore or passageway. A fluid passageway 31 also extends through the member 37 and the wall of the valve body into the cylindrical portion 17 of the internal bore or passageway, the fluid communications between the fluid passageways 30 and 31 being controlled by the valve 20 and valve seat 25. The fluid communication between the passageway 30 and the connection member 26 may likewise be controlled by the valve 20 which may be screwed to the right, as indicated in the drawing, into engagement with the valve seat 21 formed on the member 26.

The general arrangement of the various passageways and fluid connections described above is well known in the art, being substantially disclosed in my prior Patent No. 1,972,821, issued September 4, 1934, and will not be described further herein.

In order to provide a valve which can be economically manufactured of steel or other suitable inexpensive material, I preferably form the body portion 10 of the valve from ordinary square bar stock cut to the proper length and having the different sections of the internal longitudinal passageway and the transverse passageways through the valve body formed therein by suitable drilling and tapping operations.

To provide the supporting and attaching flange 27 and the various fluid connections, which extend laterally into the valve body, I preferably cut off sections of flat stock of the proper width and thickness to form the fluid conducting and supporting member 35, the reinforcing members 36, and the fluid conducting member 37. I prefer to punch the necessary openings in the members 35, 36 and 37, and thereafter assemble these parts with the valve body in the manner shown particularly in Figure 2 of the drawing, preferably before the transverse passages in the side walls of the body have been formed. The parts so assembled may then be permanently and securely joined together by any convenient welding operation, but preferably by copper brazing in a controlled atmosphere.

To carry out the copper brazing operation, copper is supplied to the contacting surfaces of the various parts in a quantity at least sufficient to form an alloy bond between the parts throughout substantially their entire areas of contact. The copper may be supplied by one of a number of convenient methods, all well known in the art of copper brazing. For example, the parts may be electro-plated with copper or coated with copper by dipping in lacquer or other suitable vehicle containing copper, or the copper may be supplied by small pellets or wires placed adjacent the contacting areas of the parts.

The assembled parts, with the copper suitably supplied thereto, are then inserted in a furnace having a controlled reducing atmosphere of hydrogen or other suitable gas or gases, and are raised to a temperature of approximately 2150° F. At this temperature and in the proper atmosphere, the copper becomes fluid and alloys with the underlying steel, forming an alloy bond of great strength between the adjacent surfaces of the various parts. The copper is drawn by capillary attraction into all of the spaces between the parts and makes a permanent leak-proof joint throughout the contacting areas.

In carrying out the copper brazing operation I may, if it appears desirable, supply copper to the assembled parts in excess of the amount required to form the welded joints, preferably by coating the parts throughout their entire areas with copper so that a layer of copper alloyed with the underlying ferrous material is formed all over the surfaces of the various parts. By this means, I am able to provide an effective corrosion resisting surface on the inside or outside or all surfaces of the valve, as may be required by the service for which it is intended.

After the copper brazing has been carried out and the body portion 10 and the supporting attaching flange and fluid conducting members are all permanently joined together, the transverse fluid passageway 31 may be threaded as shown, and the communicating passageway 38 drilled through the side wall of the body. In a similar manner the transverse passageway 39 may be drilled through the side wall of the body adjacent the member 35, thus completing the valve body in an inexpensive and expeditious manner.

It will be seen that my entire valve body can be made from inexpensive steel stock of standard readily obtainable cross section, with a minimum of machining operations. By employing flat sided stock for the body portion of the valve, the fluid connecting and supporting members can likewise be formed of flat stock without requiring any machining of the surfaces to produce a proper brazed joint therebetween. The supporting flange is of great rigidity because of its considerable thickness, and by reason of the fact that the flange is formed of laminations of flat stock which are secured to each other and to the body portion of the valve by means of a permanent alloy bond, the flange can be produced without any expensive machining operations.

Valves constructed according to my invention are compact, extremely strong and rigid, and are durable and corrosion resisting. Because my method of making valve bodies requires a relatively small amount of machine work and only simple assembly operations, and because of the economy of the material which I employ, my valves can be produced very expeditiously and economically.

It will be evident to those skilled in the art that my invention may be applied to other types of valves or various other fluid conducting devices. It is therefore to be understood that the foregoing description of a preferred form of my invention is given by way of example only and that my invention is not limited by the foregoing specification or in any manner other than by the scope of the appended claims.

I claim:

1. That method of making a longitudinally extending valve fitting having a transversely arranged supporting flange which comprises cutting a valve blank from a length of ferrous bar stock to provide a main valve body, cutting a longitudinal bore axially of the valve blank to provide an axially extending bore having portions of different diameters, shaping a valve supporting flange to provide a re-entrant middle portion conforming to and proportioned to embrace the outer wall of said valve blank, arranging said valve blank and supporting flange transversely of each other in said embraced relationship within a furnace maintaining a reducing atmosphere and copper brazing said parts in said embraced relationship and forming aligned apertures through the middle portion of said supporting flange and through the body of the valve blank to intersect said first named longitudinal bore.

2. That method of making a longitudinally extending valve fitting having a transversely arranged supporting flange which comprises cutting a valve blank from a length of ferrous bar stock to provide a main valve body, cutting a longitudinal bore axially of the valve blank to provide an axially extending bore having portions of different diameters, building up a valve supporting flange having a re-entrant middle portion conforming to and proportioned to embrace the outer wall of said valve blank from a plurality of laminations of flat stock, arranging said valve blank and said supporting flange with said flange disposed transversely of said blank and embracing the outer wall thereof within a furnace having a controlled reducing atmosphere and copper brazing the laminations making up said flange to each other and to said valve body in said embraced relationship, and forming aligned apertures through the middle portion of said supporting flange and through the body of the valve blank to intersect the longitudinal bore of the valve blank.

3. That method of making a longitudinally extending valve fitting having a transversely arranged supporting flange which comprises cutting a valve blank from a length of rectangular steel bar stock to provide a main valve body, cutting a longitudinal bore axially of the valve blank to provide an axially extending bore having portions of different diameters, building up a valve supporting flange having a re-entrant middle portion conforming to and proportioned to embrace the outer wall of said valve blank from a plurality of laminations of flat stock, assembling said built up flange transversely of said valve blank and embracing the outer wall thereof, placing said assembly within a furnace having a controlled reducing atmosphere and copper brazing the laminations making up said flange to each other and to said valve body in said embraced relationship, and thereafter forming aligned apertures through the middle portion of said supporting flange and through the body of the valve blank to intersect the longitudinal bore of the valve blank.

ALBERT J. WEATHERHEAD, Jr.